United States Patent [19]

Hendren

[11] Patent Number: 4,909,692

[45] Date of Patent: Mar. 20, 1990

[54] ELECTRICAL RECEPTACLE MOUNTING SPACERS

[76] Inventor: Stephen R. Hendren, 13201 NW. 1st Ct., N. Miami, Fla. 33168

[21] Appl. No.: 282,514

[22] Filed: Dec. 12, 1988

[51] Int. Cl.⁴ .................. F16B 43/00; B65D 85/16
[52] U.S. Cl. .................................. 411/544; 174/57;
206/338; 206/342; 206/806; 206/820; 220/3.7;
411/535; 411/546
[58] Field of Search ............... 206/493, 526, 820, 338,
206/342, 806; 411/535, 536, 546, 544;
248/DIG. 6; 174/51, 57; 220/3.7, 3.3

[56] References Cited

U.S. PATENT DOCUMENTS

| | | | |
|---|---|---|---|
| 1,688,518 | 10/1928 | Bennett | 174/57 |
| 2,772,596 | 12/1956 | Trussell | 411/535 |
| 2,980,756 | 9/1961 | Kelleher | 174/57 |
| 3,404,827 | 10/1968 | Carmody | 206/820 X |
| 3,651,245 | 3/1972 | Moll | 174/51 |
| 3,720,783 | 3/1973 | Moll | 174/51 |
| 3,722,671 | 3/1973 | Wright et al. | 206/338 |
| 3,841,473 | 10/1974 | Bagrie | 206/338 |
| 4,234,090 | 11/1980 | Barbieri et al. | 206/459 |
| 4,289,060 | 9/1981 | Emmett | 411/544 X |
| 4,289,061 | 9/1981 | Emmett | 411/544 X |
| 4,300,684 | 11/1981 | Smith et al. | 206/493 |
| 4,303,362 | 12/1981 | Lockhart | 411/544 X |
| 4,533,277 | 8/1985 | Alexander et al. | 411/544 X |
| 4,680,426 | 7/1987 | Hawker et al. | 174/57 |
| 4,747,737 | 5/1988 | Roffelsen | 411/546 X |
| 4,817,794 | 4/1989 | Workman | 206/820 X |

FOREIGN PATENT DOCUMENTS

| | | | |
|---|---|---|---|
| 2436275 | 5/1980 | France | 206/338 |
| 8002274 | 10/1980 | PCT Int'l Appl. | 911/535 |

OTHER PUBLICATIONS

ECY Clip Sample Provided by Applicant as Prior Art (no date).

*Primary Examiner*—Bryon P. Gehman
*Attorney, Agent, or Firm*—Alvin S. Blum

[57] ABSTRACT

When an electrical device such as a receptacle switch or the like is fixedly wired into building wiring, it is electrically and mechanically connected to an outlet box inside the wall. The device is fastened to the face of the box by screws. Ordinarily, the opening in the wall for recessing the device has minimal clearance to admit only the device and the device has extending projections that engage the wall surface around the opening so that the device mounts flush with the wall surface. When the opening is oversize, the projections pass through the opening and the workman cannot secure the receptacle firmly and mount it flush with the wall. The invention provides a set of insulated horizontal spacer members mounted parallel to one another and flexibly joined together by flimsy vertical joining elements that are readily broken apart. The workman can break off a portion of the assembly that will provide the necessary total spacing thickness and place it between the projections and the junction box. The horizontal members have an axial hole for receiving the screw that fastens the device to the box. The members are molded of a suitable insulating plastic with enough resilience so that the joining elements holding individual members apart collapse when the screw is tightened.

15 Claims, 3 Drawing Sheets

4,909,692

ELECTRICAL RECEPTACLE MOUNTING SPACERS

BACKGROUND OF THE INVENTION

This invention relates generally to junction boxes and electrical accessories thereto and more particularly to means for mounting conventional switches, outlets and the like on electrical junction boxes so that they are flush with the wall surface and securely held in place.

Electrical wiring inside building walls generally runs through conduits to junction boxes. Wall mounted electrical devices such as switches, outlets and the like are electrically connected to the wiring within the junction box and the device is mounted flush with the wall by grounding screws that pass through a metal yoke on the device and into threaded tabs on the junction box cover. A hole in the finish wall is made just large enough to admit the device. The yoke has extended ears that engage the outer wall surface around the hole as the grounding screws are drawn up so that the device assumes a predictable flush orientation relative to the surface and is held firmly thereto. A cover plate is then secured to the device for a finished appearance covering the mounting elements.

Occasionally the hole in the wall is too large and the ears cannot engage the outer wall surface. The device cannot be securely mounted in flush position without awkward measures.

Moll in U.S. Pat. Nos. 3,720,783 issued 3/13/73 and 3,651,245 issued 3/21/72 describes metallic tubular spacers that can be broken off at lines of weakness to provide adjustable spacing with a rigid metal to metal connection between yoke and junction box for secure mounting and secondary electrical grounding. Pliers can be used to snap off the unwanted portion of the tube, but two pliers should be used to ensure snapping off at the desired level. Since the tube is rigid and there is a finite distance between lines of weakening, the final length of spacer may not position the device exactly flush with the wall. Moll further provides a cover for the junction box with a fire retardant collar that extends out past the wall. This collar has break away portions that may be broken or cut away with pliers to be flush with the wall. This is an awkward and expensive assembly that increases labor costs without providing the completely flush arrangement desired.

SUMMARY OF THE INVENTION

It is accordingly an object of the invention to provide a supplemental means for securely mounting an electrical device on a junction box so that the device will be flush with the wall surface when the workman finds that the ears on the yoke cannot make contact with the wall in the usual manner. It is a further object that the means be easy to use and inexpensive.

The spacer means of the invention comprises a plurality of flat, thin members arranged in a stack, having a common hole to receive the grounding screw passing axially through the stack. The individual members of the stack are joined together by flimsy joining elements that are easily pulled apart at a level selected to yield a stack of suitable length for the particular spacing requirement. The shortened stack is placed between yoke and mounting tabs on the junction box cover and the mounting and grounding screw is passed through the combination and screwed in. As the screw is tightened, the joining elements bend and the gap between individual members disappears. The entire assembly is molded in one piece from a resilient plastic. As the screw is pulled up snug, the individual members can be compressed slightly so that the level of the yoke at that point can be adjusted to the level of the wall. The stack is quite long so that one stack may be used for a number of applications, the workman only breaking off as much as is needed.

DETAILED DESCRIPTION OF PREFERRED EMBODIMENTS

Figure 2:
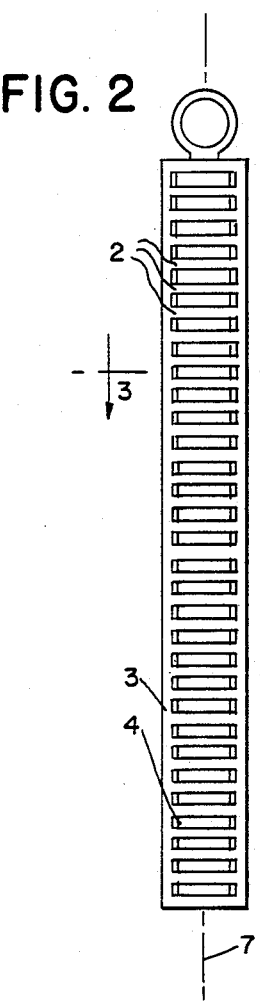
FIG. 2 is a front elevation view of the invention.
Figure 3:
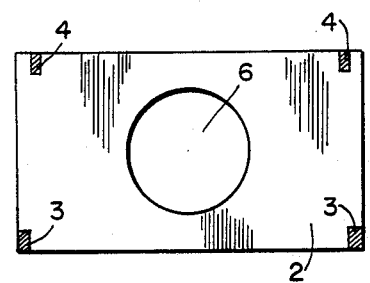
FIG. 3 is a sectional view taken through line 3—3 of FIG. 2.
Figure 4:
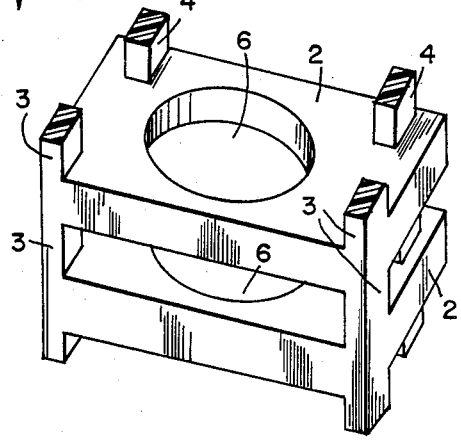
FIG. 4 is a perspective view of a portion of the stack of FIG. 2 with connecting elements enlarged for illustrative purposes.

Referring now first to FIGS. 2,3 and 4, the invention comprises a stack 1 of thin, flat horizontal members 2 joined together by flimsy vertical connecting elements 3 and 4. The stack 1 is topped by a convenience loop 5 that can hang the device from a workman's belt or a merchandise display. A common screw-receiving hole 6 runs axially through all the horizontal members 2 as indicated by center line 7. The connecting elements 3 and 4 are shown to scale in FIGS. 2 and 3, but are exaggerated for illustrative purposes in FIG. 4. They are arranged in staggered orientation so that the device may be molded of plastic in one piece by a simple opening and closing mold. The mold does have the complexity that a rod or mandrel to form the hole 6 must be moved in and out with each molding operation.

Figure 5:
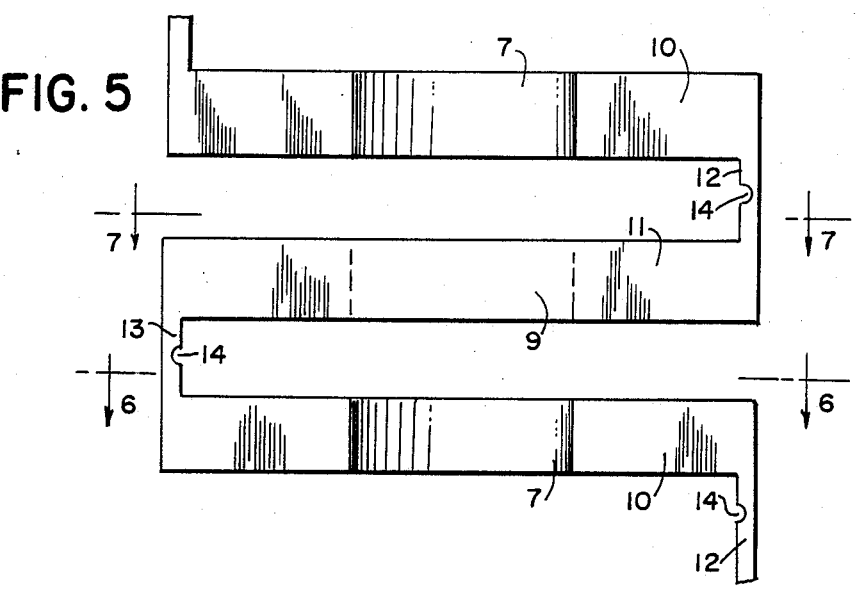
FIG. 5 is a front elevation view of an alternative embodiment of the invention.
Figure 6:
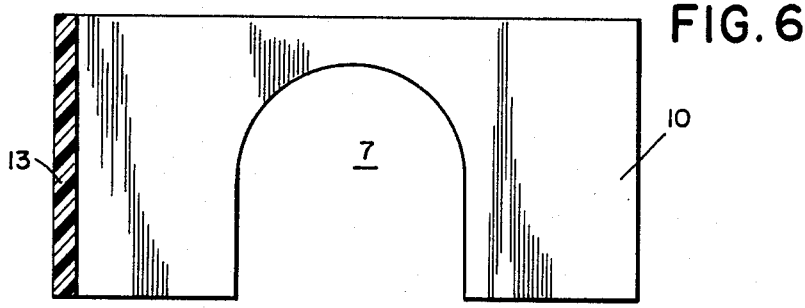
FIG. 6 is a cross sectional view through line 6—6 of FIG. 5.
Figure 7:
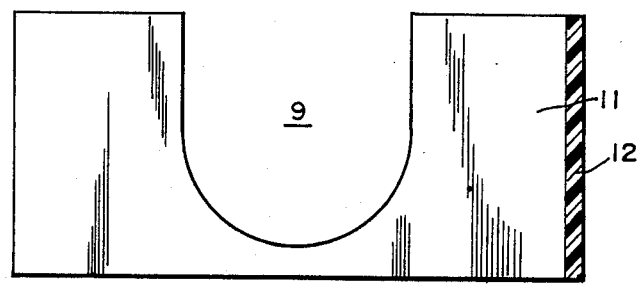
FIG. 7 is a cross sectional view through line 7—7 of FIG. 5 showing a single member.

The embodiment shown in FIGS. 5,6 and 7 overcomes this problem by providing alternate rectangular members 10 and 11 having long and short sides with side opening holes 7 and 9 that open at alternate long sides. The flimsy vertical connecting elements 12 and 13 may have lines of weakening 14. The mold for this embodiment is less costly.

Figure 1:
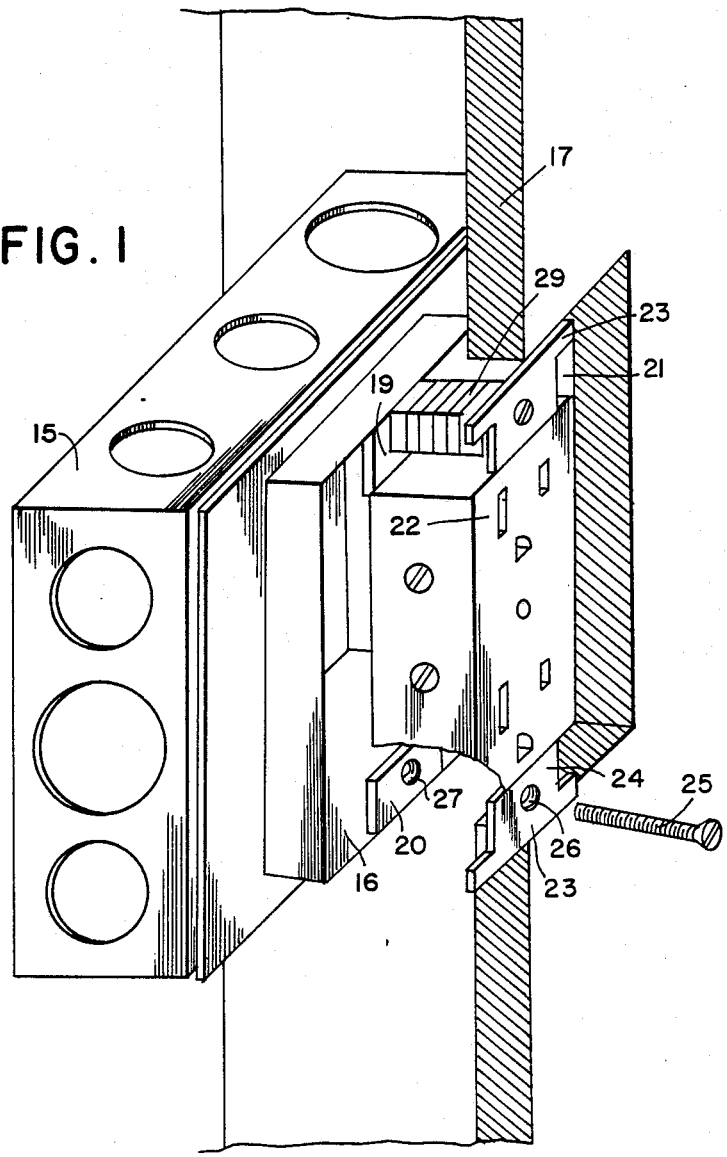
FIG. 1 is a perspective view of the invention in use on a junction box with portions broken away.

FIG. 1 shows how the device of the invention is used. A junction box 15 with junction box cover 16 has two mounting tabs 19 and 20 with threaded screw holes 21 to receive grounding screws 25 that hold metal yoke 24 of electrical device 22 in place. Ordinarily, the hole 21 in the wall 17 is cut just large enough to receive the electrical device 22 (a wall receptacle) but small enough so that the ears 23 on yoke 24 of device 22 engage the face of wall 17. This is the case for the lower ears 23. Mounting screw 25 is then passed through hole 26 of the yoke and lined up with and engaged in threaded hole 27. When the screw 25 is pulled up tight, the yoke is held against the wall surface in position to receive a cover plate that will rest against the wall and cover the assembly. The upper portion of hole 21 in wall 17 has been inadvertently made too large so that yoke 24 would be drawn into the hole by the grounding screw. This often happens especially with a gypsum plaster wall where a piece of plaster may break off incorrectly. Since it is awkward to interrupt electrician's work to call in a plasterer to correct the problem, it may be ignored. This results in a loose device and a poor electrical ground. Or makeshift shims may be prepared at considerable cost in skilled labor.

The problem is quickly solved by the device of the invention. The electrician estimates the length of spacer required. He breaks off from the stack 1 an appropriate length to form a short stack 29. The flimsy vertical connector elements 3 and 4 are easily broken away at the desired level by pulling apart with the fingers. He positions this short stack 29 between the tab 19 on the junction box cover and the yoke so that holes 6 line up with the mounting holes and passes the mounting and grounding screw through the combination. As the screw is drawn up, the flimsy connecting elements 3 and 4 or 12 and 13 are bent away and deformed so that the flat faces of the horizontal members 2 are pressed together. The device is made of a resilient plastic that yields sufficiently under compression that the yoke may be pulled up exactly to the desired flush position for a very secure assembly without regard for breaking away a short stack of a precise length. The distance between members 2 may be arranged to equal the thickness of the members to simplify estimation of how much to break off, since it will be twice the distance.

There are enough horizontal members in one stack to allow one stack to be used for many connections.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

I claim:

1. Spacer means for adjustably supporting an electrical device having a yoke with at least one hole for receiving a grounding and mounting screw upon a junction box with at least one screw-receiving mounting tab at a particular level with a surrounding wall surface, said spacer means comprising:
   (a) a plurality of substantially flat spacer members, each having a pair of broad opposed faces, said members arranged with all said faces parallel to a first plane, and each of said members having a screw-receiving aperture means for receiving a said screw passing therethrough perpendicular to said first plane;
   (b) flimsy connecting means connecting said members one to another with a space therebetween so as to form an elongate stack of said members with said aperture means aligned to form a channel through which a said screw my pass;
   (c) said connecting means constructed with a weakness for easy breaking at a selected level to provide a short stack with enough of said members to span the distance between a said yoke and a said tab when said device is at said particular level; and
   (d) said flimsy connecting means further constructed to deform and eliminate said space between members when a said screw is passed through a said yoke, said members, and into a said tab and drawn up tightly.

2. The spacer means according to claim 1, molded of a plastic material having sufficient resilience to cause said spacer means to compress when a said screw is tightened to provide fine adjustment of said level.

3. The spacer means according to claim 2, in which said connecting means separate said members vertically from one another by a space substantially equal to the thickness of said members to facilitate estimation of the necessary length of said short stack for a particular application.

4. The spacer means according to claim 3, in which said members are substantially rectangular in shape.

5. The spacer means according to claim 2, in which said members are each substantially rectangular in shape having a first long side, a second long side, and two short sides.

6. The spacer means according to claim 5, in which said connecting means are arranged in a staggered orientation to facilitate manufacture.

7. The spacer means according to claim 5 in which said members are of two different structures arranged alternately in said elongate stack to facilitate manufacture:
   (a) in a first structure said aperture means extends to said first long side of said member;
   (b) in a second structure said aperture means extends to said second long side of said member.

8. The spacer means according to claim 2, including a suspending means at one end of said elongate stack for suspending said spacer means.

9. Spacer means for adjustably supporting an electrical device having a yoke with at least one hole for receiving a grounding and mounting screw upon a junction box with at least one screw-receiving mounting tab at a particular level with a surrounding wall surface and for other like spacing applications, said spacer means comprising:
   (a) a plurality of flat thin plates arranged in a stack, each of said plates having a pair of opposed broad faces, said plates arranged spaced apart from one another with all said faces parallel to a first plane;
   (b) aperture means in each of said plates for receiving a said screw, said aperture means in each plate extending between said pair of broad faces in a direction perpendicular to said plane;
   (c) at least two spacing members extending from each broad face of each of said plates that adjoins of said plates, said spacing members extending to the adjacent face of an adjoining plate substantially perpendicular to said broad faces and securely affixed to said broad faces, said spacing members arranged to hold said plates spaced apart from one another;
   (d) said spacing members having a cross-section so small relative to said plates that they are readily torn away to reduce the number of said plates in an assembly to suit a particular application, said spacing members being adapted to readily deform when compressed by a said screw to obliterate the space between adjoining plates, and in which said aperture means of all of said plates are aligned to form a channel for a said screw.

10. The spacer means according to claim 9, in which said plates are substantially rectangular, having two short sides and two long sides and said aperture means is situated substantially midway between said short sides and one of said spacing members extends substantially from each of the four corners of said broad face to said adjoining plate.

11. The spacer means according to claim 10, in which said aperture means extends to one of said long sides.

12. The spacer means according to claim 11 further comprising suspending means for suspending said stack, said suspending means connected to one end of said stack.

13. The spacer means according to claim 12, in which the space between adjacent plates is substantially equal to the thickness of said plate to facilitate estimation of the length of said stack necessary for a particular application.

14. The spacer means according to claim 10 further comprising suspending means for suspending said stack, said suspending means connected to one end of said stack.

15. The spacer means according to claim 14, in which the space between adjacent plates is substantially equal to the thickness of said plate to facilitate estimation of the length of said stack necessary for a particular application.

* * * * *